US011378102B1

(12) United States Patent
Quinn et al.

(10) Patent No.: US 11,378,102 B1
(45) Date of Patent: Jul. 5, 2022

(54) FLOW MANAGEMENT OF A HYDRAULIC SYSTEM

(71) Applicant: DEERE & COMPANY, Moline, IL (US)

(72) Inventors: Aaron M. Quinn, Cedar Falls, IA (US); Dwayne A. Nystrom, Waterloo, IA (US); Nicholas R. Hensch, North Liberty, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/443,836

(22) Filed: Jul. 28, 2021

(51) Int. Cl.
*F15B 11/17* (2006.01)
*F15B 11/16* (2006.01)

(52) U.S. Cl.
CPC ............ *F15B 11/165* (2013.01); *F15B 11/17* (2013.01); *F15B 2211/20553* (2013.01); *F15B 2211/30555* (2013.01); *F15B 2211/6057* (2013.01); *F15B 2211/6058* (2013.01); *F15B 2211/651* (2013.01)

(58) Field of Classification Search
CPC ..... F15B 11/165; F15B 11/166; F15B 11/168; F15B 11/17; E02F 9/2239; E02F 9/2242
See application file for complete search history.

(56) References Cited

U.S. PATENT DOCUMENTS

| | | | |
|---|---|---|---|
| 4,024,710 A * | 5/1977 | Zelle | F15B 11/17 60/420 |
| 4,087,968 A * | 5/1978 | Bianchetta | F15B 11/165 60/445 |
| 4,801,247 A | 1/1989 | Hashimoto et al. | |
| 5,048,293 A | 9/1991 | Aoyagi | |
| 6,170,261 B1 * | 1/2001 | Ishizaki | F15B 11/165 60/421 |
| 6,323,672 B1 | 11/2001 | Starr | |
| 7,076,947 B2 * | 7/2006 | Ariga | F15B 11/17 60/452 |
| 7,918,285 B1 | 4/2011 | Graham et al. | |
| 8,170,762 B2 | 5/2012 | Foster et al. | |
| 8,573,111 B2 | 11/2013 | Graham et al. | |
| 9,394,894 B2 | 7/2016 | Fedde | |
| 9,671,009 B2 | 6/2017 | Nystrom et al. | |

(Continued)

FOREIGN PATENT DOCUMENTS

DE    102012023419 A1    6/2014

OTHER PUBLICATIONS

Quinn et al., unpublished U.S. Appl. No. 17/443,833, titled Flow Management of a Hydraulic System, concurrently filed Jul. 28, 2021.

(Continued)

*Primary Examiner* — Michael Leslie

(57) ABSTRACT

A hydraulic system for a work vehicle includes a first pump providing a first flow in a first circuit having a first pressure. A first load sense circuit connected to a first load sensing compensator of the first pump. The first load sense circuit having a first load sense pressure. A supplemental pump provides a supplemental flow to a supplemental circuit having a supplemental pressure. A supplemental load sense circuit connected to a supplemental load sensing compensator of the supplemental pump. A first supplemental valve selectively enables flow from the first load sense circuit to the supplemental load circuit based in part on a first pressure differential between the first pressure and the first load sense pressure. A first valve selectively enables flow from the supplemental circuit to the first circuit when the supplemental pressure is equal to or greater than the first pressure.

20 Claims, 10 Drawing Sheets

(56) References Cited

U.S. PATENT DOCUMENTS

| | | | |
|---|---|---|---|
| 9,890,801 B2* | 2/2018 | Takahashi | F15B 11/17 |
| 10,563,377 B2* | 2/2020 | Kishida | F15B 11/165 |
| 2016/0273192 A1 | 9/2016 | Kajita et al. | |
| 2020/0025193 A1 | 1/2020 | Remmelmann et al. | |
| 2020/0324810 A1 | 10/2020 | Meid et al. | |

OTHER PUBLICATIONS

Quinn et al., unpublished U.S. Appl. No. 17/443,834, titled Flow Management of a Hydraulic System, concurrently filed Jul. 28, 2021.
Eaton, Load Sensing Systems Principle of Operation, Nov. 1992, 28 pages.
Parker, Hydraulic Pump Basics, Jul. 2005, 65 pages.
Eaton, PVH Variable Displacement Piston Pumps, Oct. 2013, 33 pages.
Deere & Company, Hydraulic System, pressure and flow compensated, Jul. 25, 2013, 2 pages.
Deere & Company, Hydraulics, closed center, pressure and flow compensated (PFC), 29 gpm, Aug. 25, 2011, 2 pages.
Deere & Company, Hydraulics, closed-center, pressure-and-flow compensated (pfc)—29 gpm, Jul. 25, 2013, 2 pages.
Lunchbox Sessions, Load Sensing Pumps, retrieved from <https://www.lunchboxsessions.com/materials/load-sensing-pumps/load-sensing-pumps-lesson> on May 14, 2021, 30 pages.
USPTO, Non-final Office Action in U.S. Appl. No. 17/443,833, dated Feb. 14, 2022, 12 pages.

* cited by examiner

FLOW MANAGEMENT OF A HYDRAULIC SYSTEM

CROSS-REFERENCE TO RELATED APPLICATIONS

N/A

FIELD OF THE DISCLOSURE

The present disclosure relates to flow management of a hydraulic system for a work vehicle.

BACKGROUND

Work vehicles can include a hydraulic system with one or more variable displacement hydraulic pumps. The hydraulic system can provide hydraulic flow to various implements attached or connected to the work vehicle. The hydraulic flow can be proportional to the engine speed of the work vehicle. The numbers and sizes of the hydraulic pumps for the hydraulic system can be determined by the amount of hydraulic flow available at the lowest operating engine speed.

Current tractor hydraulic systems include variable displacement, pressure and flow compensated (PFC) hydraulic pumps providing hydraulic flow to implements through individual selective control valves (SCVs). The maximum flow provided by each pump is proportional to engine speed. As engine speed decreases, for example at an end-row turn, the available hydraulic flow to the implement is reduced, which can lead to reduced implement performance. Some tractor hydraulic systems include an additional pump operating at a lower margin pressure level than the standard pump, but this additional pump continuously operates at elevated pressure levels due to the load signal from the implement even when additional flow is not needed. This leads to increased pump flow leakages and results in increased parasitic power losses when additional flow is not required.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a hydraulic system having a plurality of hydraulic pumps for providing hydraulic flow to an implement attached or connected to a work vehicle.

According to an aspect of the present disclosure, a hydraulic system for a work vehicle including a first pump providing a first flow in a first circuit to a first plurality of selective control valves. The first pump has a first swashplate. The first circuit has a first pressure. A first load sense circuit connects to a first load sensing compensator of the first pump. The first load sense circuit has a first load sense pressure. A supplemental pump provides a supplemental flow to a supplemental circuit. The supplemental pump has a supplemental swashplate. The supplemental pump operates at a lower flow in a standby condition and a higher flow in a use condition. The supplemental circuit having a supplemental pressure. A supplemental load sense circuit connects to a supplemental load sensing compensator of the supplemental pump. The supplemental load sense circuit has a supplemental load sense pressure. A first supplemental valve has a first position preventing flow and a second position allowing flow from the first load sense circuit to the supplemental load circuit. The position of the first supplemental valve is based in part on a first pressure differential between the first pressure and the first load sense pressure. A first valve selectively enables flow from the supplemental circuit to the first circuit when the supplemental pressure is equal to or greater than the first pressure.

According to an aspect of the present disclosure, the hydraulic system further includes a second pump providing a second flow in a second circuit to a second plurality of selective control valves. The second pump has a second swashplate. The second circuit has a second pressure. A second load sense circuit connects to a second load sensing compensator of the second pump. The second load sense circuit has a second load sense pressure. A second supplemental valve has a first position preventing flow and a second position allowing flow from the second load sense circuit to the supplemental load circuit. The position of the second supplemental valve is based in part on a second pressure differential between the second pressure and the second load sense pressure. A second valve selectively enables flow from the supplemental circuit to the second circuit when the supplemental pressure is equal to or greater than the second pressure.

According to an aspect of the present disclosure, the first supplemental valve connects to the first circuit via a first pilot line and to the first load sense circuit via a second pilot line.

According to an aspect of the present disclosure, the first supplemental valve is in the first position when a pressure in the second pilot line is less than a combined pressure in the first pilot line and a first spring force.

According to an aspect of the present disclosure, the first supplemental valve is in the second position when a pressure in the second pilot line is greater than a combined pressure in the first pilot line and a first spring force.

According to an aspect of the present disclosure, the second supplemental valve connects to the second circuit via a third pilot line and to the second load sense circuit via a fourth pilot line.

According to an aspect of the present disclosure, the second supplemental valve is in the first position when a pressure in the fourth pilot line is less than a combined pressure in the third pilot line and a second spring force.

According to an aspect of the present disclosure, the second supplemental valve is in the second position when a pressure in the fourth pilot line is greater than a combined pressure in the third pilot line and a second spring force.

According to an aspect of the present disclosure, the hydraulic system further includes an intermediate valve connecting one of the first load sense circuit and the load sense circuit to the supplemental load sensing compensator based in part on the greater of the first pressure differential and the second pressure differential.

According to an aspect of the present disclosure, the supplemental load sense circuit provides a minimal supplemental load sense pressure to the supplemental load sensing compensator when the first supplemental valve is in the first position, which causes the supplemental pump to provide the lower flow.

According to an aspect of the present disclosure, the supplemental load sense circuit provides an increased or higher supplemental load sense pressure to the supplemental load sensing compensator when the first valve is in the second position, which causes the supplemental pump to provide the higher flow.

According to an aspect of the present disclosure, the supplemental load sense circuit provides a minimal supplemental load sense pressure to the supplemental load sensing compensator when both the first supplemental valve is in the first position and the second supplemental valve is in the first position, which causes the supplemental pump to provide the lower flow.

According to an aspect of the present disclosure, the supplemental load sense circuit provides an increased or higher supplemental load sense pressure to the supplemental load sensing compensator when one or more of the first supplemental valve is in the second position and the second supplemental valve is in the second position, which causes the supplemental pump to provide the higher flow.

According to an aspect of the present disclosure, a method of providing supplemental flow for a hydraulic system of a work vehicle includes: operating a first pump to provide a first flow in a first circuit having a first pressure to a first plurality of selective control valves; adjusting a first swashplate of the first pump via a first load sense circuit having a first load sense pressure; operating a supplemental pump to provide a lower flow in a standby condition and a higher flow in a use condition in a supplemental circuit having a supplemental pressure; adjusting a supplemental swashplate of the supplemental pump via a supplemental load sense circuit having a supplemental load sense pressure; selectively enabling flow from the first load sense circuit to the supplemental load circuit via a first supplemental valve based in part on a first pressure differential between the first pressure and the first load sense pressure; and selectively enabling flow from the supplemental circuit to the first circuit via a first valve when the supplemental pressure is equal to or greater than the first pressure.

According to an aspect of the present disclosure, the method further includes: operating a second pump to provide a second flow in a second circuit having a second pressure to a second plurality of selective control valves; adjusting a second swashplate of the second pump via a second load sense circuit having a second load sense pressure; selectively enabling flow from the second load sense circuit to the supplemental load circuit via a second supplemental valve based in part on a second pressure differential between the second pressure and the second load sense pressure; and selectively enabling flow from the supplemental circuit to the second circuit via a second valve when the supplemental pressure is equal to or greater than the second pressure.

According to an aspect of the present disclosure, the method further includes selectively enabling flow from one of the first load sense circuit and the second load sense circuit to the supplemental load sensing compensator via an intermediate valve based in part on the greater of the first pressure differential and the second pressure differential.

According to an aspect of the present disclosure, the method further includes: operating the first supplemental valve in a first position preventing flow from the first load sense circuit to the supplemental load circuit when a pressure in a second pilot line connected to the first load sense circuit is less than a combined pressure in a first pilot line connected to the first circuit and a first spring force of the first supplemental valve; and operating the first supplemental valve in a second position allowing flow from the first load sense circuit to the supplemental load circuit when a pressure in a second pilot line connected to the first load sense circuit is greater than a combined pressure in a first pilot line connected to the first circuit and a first spring force of the first supplemental valve.

According to an aspect of the present disclosure, the method further includes: operating the second supplemental valve in a first position preventing flow from the second load sense circuit to the supplemental load circuit when a pressure in a fourth pilot line connected to the second load sense circuit is less than a combined pressure in a third pilot line connected to the second circuit and a second spring force of the second supplemental valve; and operating the second supplemental valve in a second position allowing flow from the second load sense circuit to the supplemental load circuit when a pressure in a fourth pilot line connected to the second load sense circuit is greater than a combined pressure in a third pilot line connected to the second circuit and a second spring force of the second supplemental valve.

According to an aspect of the present disclosure, the method further includes providing a minimal supplemental load sense pressure to the supplemental load sensing compensator via the supplemental load sense circuit when the first supplemental valve is in the first position and the second supplemental valve is in the first position, which causes the supplemental pump to provide the lower flow.

According to an aspect of the present disclosure, the method further includes providing an increased or higher supplemental load sense pressure to the supplemental load sensing compensator via the supplemental load sense circuit when one or more of the first supplemental valve is in the second position and the second supplemental valve is in the second position, which causes the supplemental pump to provide the higher flow.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

Figure 1:
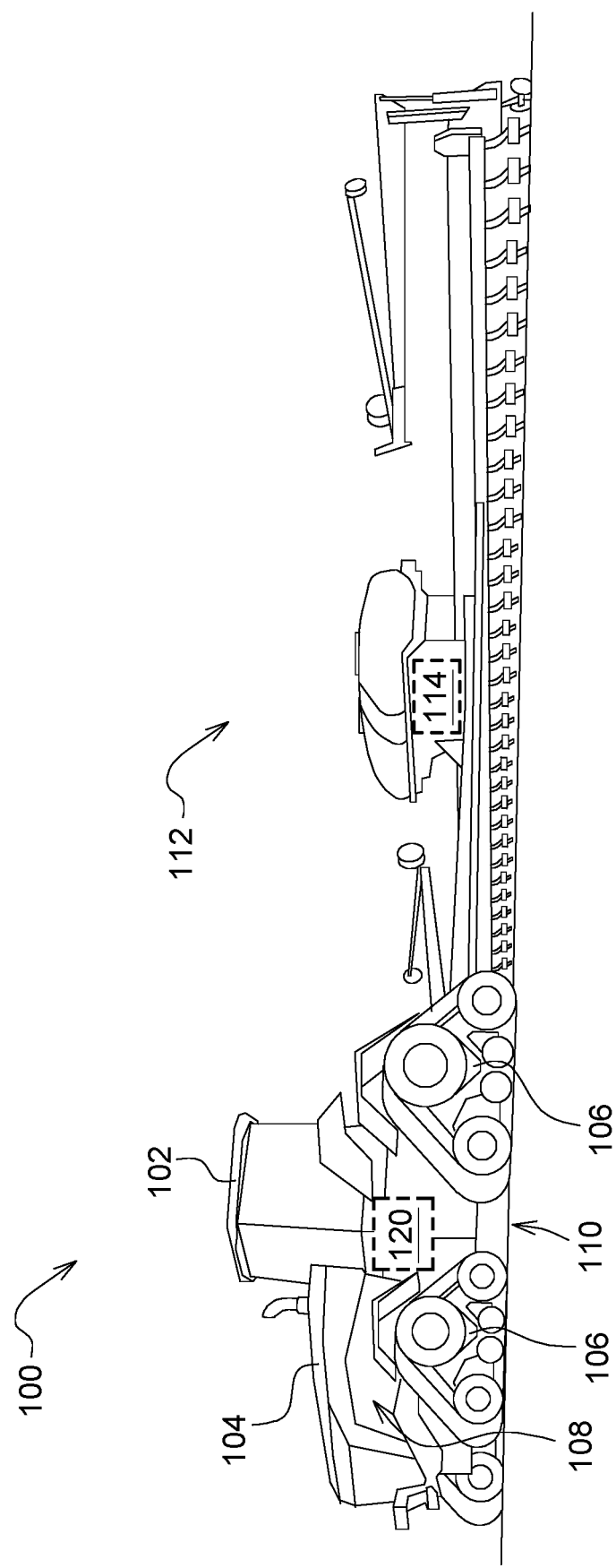
FIG. 1 is a perspective view of a work vehicle, according to an implementation.

FIG. 1 illustrates an agricultural work vehicle 100, for example an agricultural tractor. This disclosure also applies to other types of work vehicles in agriculture, construction, forestry, and road building. The agricultural work vehicle 100, hereinafter referred to as a work vehicle 100, can include a frame or chassis 110, an operator station or cab 102, and one or more ground engaging apparatus 106, for example wheels or track assemblies. The work vehicle 100 can have a rigid or an articulated frame 110. The work vehicle 100 can include a power source 108 positioned under a covering or hood 104 and a transmission transferring power to the ground engaging apparatus 106, hereinafter referred to as wheels 106, and one or more power take off shafts. The work vehicle 100 can include an operator interface having any number and combination of electronic devices, such as an interactive display. The work vehicle 100 can include a hydraulic system 120, which can be connected or coupled to a hydraulic system 114 of an implement 112 having one or more implement hydraulic circuits 116, 118.

Figure 2:
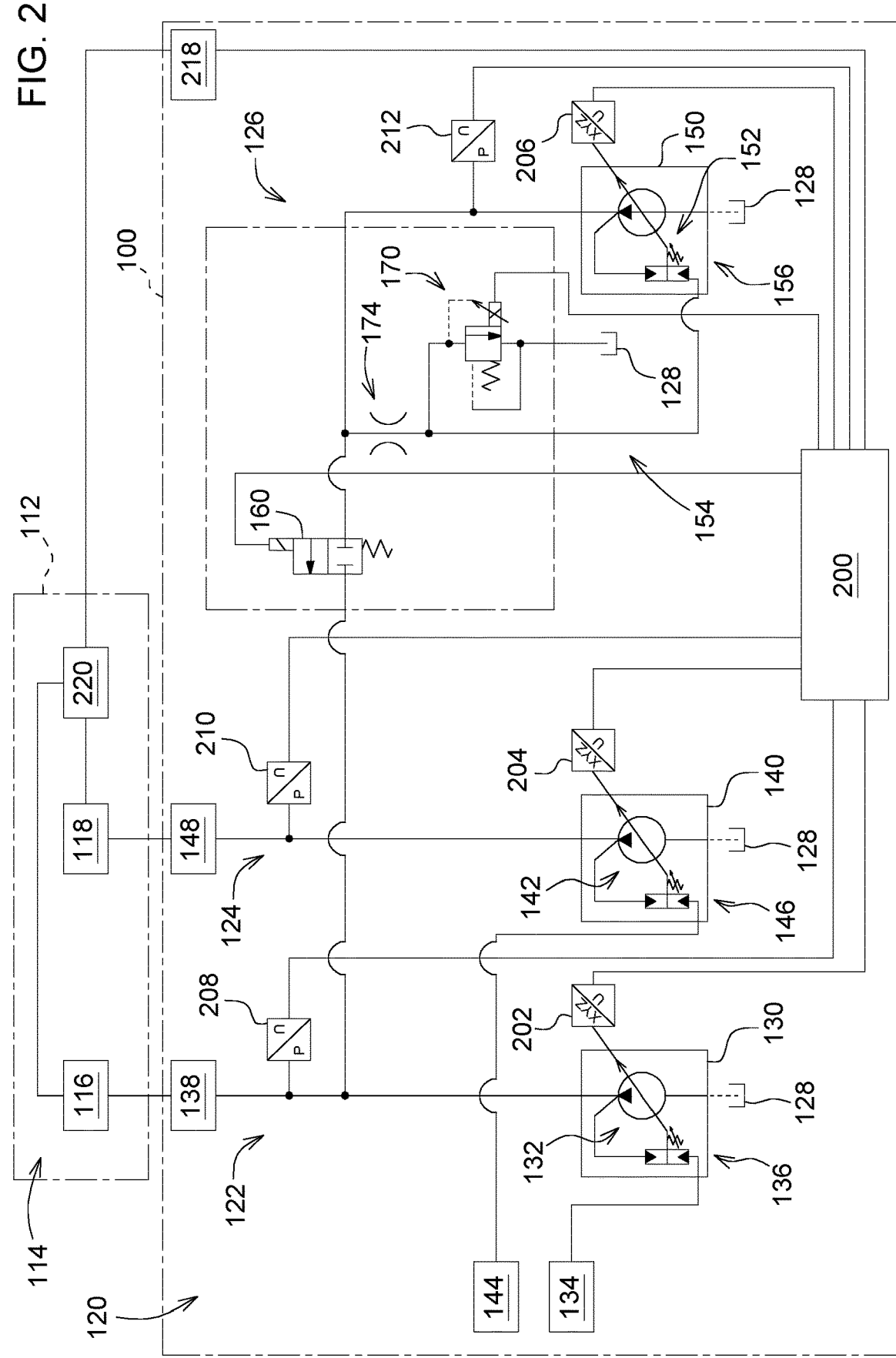
FIG. 2 is a schematic diagram of a hydraulic system for a work vehicle, according to an implementation.
Figure 3:
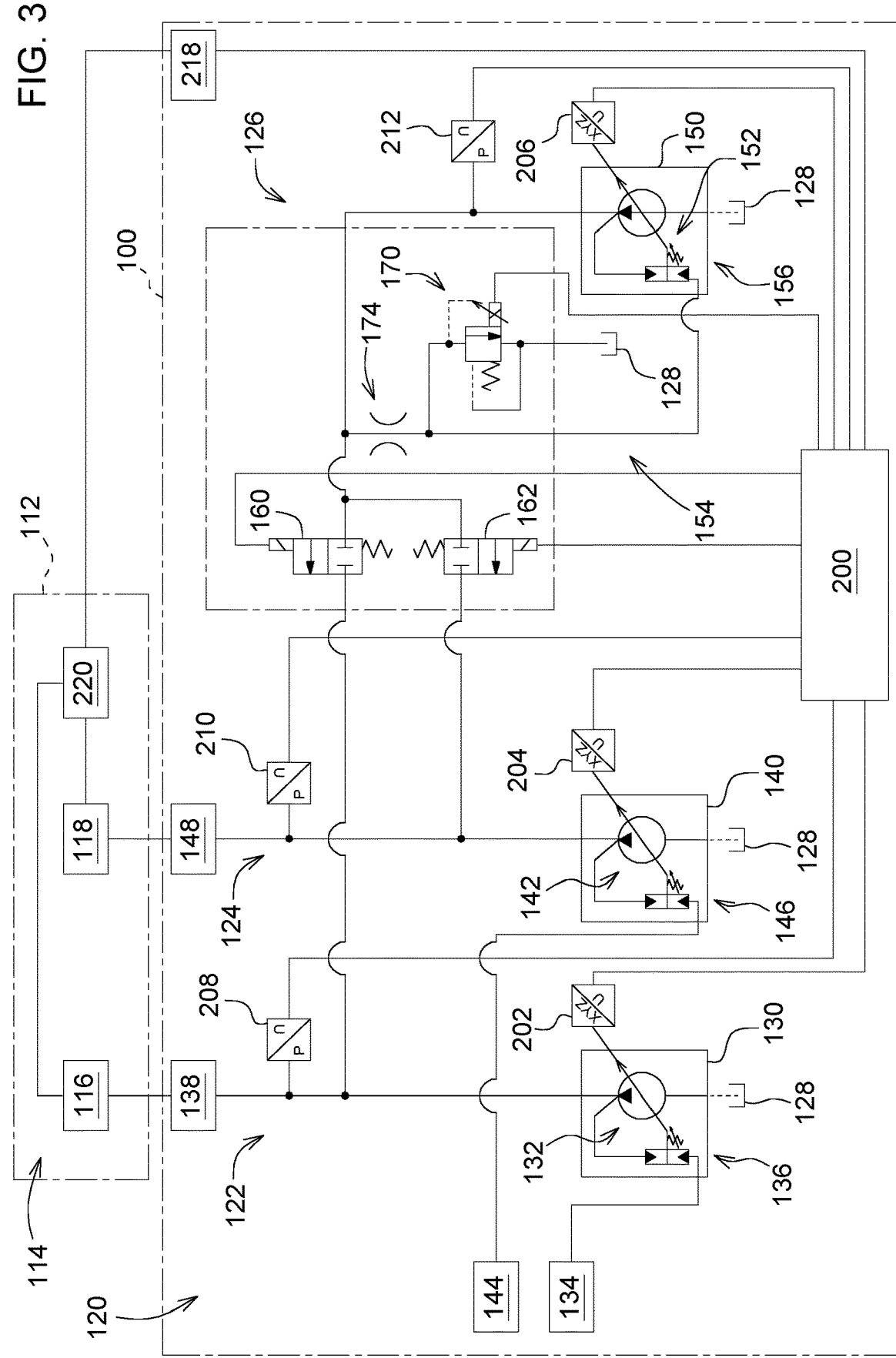
FIG. 3 is a schematic diagram of a hydraulic system for a work vehicle, according to an implementation.

With reference to FIGS. 2 and 3, a hydraulic system 120 of the work vehicle 100 can be connected to the hydraulic system 114 of the implement 112 via one or more sets of individual selective control valves (SCVs) 138, 148. Each set of SCVs 138, 148 can include one or more SCVs. In any of the implementations for any of the FIGURES, the hydraulic system 120 can include one or more of a first circuit 122, a second circuit 124, and a supplemental circuit 126 in any combination. In some implementations, the hydraulic system 120 can include a first circuit 122 and a supplemental circuit 126. In other implementations, the hydraulic system 120 can include a first circuit 122, a second circuit 124, and a supplemental circuit 126. The first and second circuits 122, 124 can be the primary hydraulic circuits for providing hydraulic fluid flow to first and second implement hydraulic circuits 116, 118. The supplemental circuit 126 can provide additional or supplemental hydraulic fluid flow to the first circuit 122, the second circuit 124, or both. In some implementations, the first circuit 122 can be connected to a first implement hydraulic circuit 116 via a first set of SCVs 138. Alternatively, or additionally, the second circuit 124 can be connected to a second implement hydraulic circuit 118 via a second set of SCVs 148.

The first circuit 122 can include a first pump 130 having a first swashplate 132 and a flow or load sensing compensator 136 connected to a first load sense circuit 134, which provides pressure feedback to adjust an angle of the first swashplate 132. The first circuit 122 can provide hydraulic fluid flow to the first set of SCVs 138. The second circuit 124 can include a second pump 140 having a second swashplate 142 and a flow or load sensing compensator 146 connected to a second load sense circuit 144, which provides pressure feedback to adjust an angle of the second swashplate 142. The second circuit 124 can provide hydraulic fluid flow to the second set of SCVs 148. The supplemental circuit 126 can include a supplemental pump 150 having a supplemental swashplate 152 and a flow or load sensing compensator 156 connected to a supplemental load sense circuit 154, which provides pressure feedback to adjust an angle of the supplemental swashplate 152. The first and second pumps 130, 140 can be the primary pumps for the first and second circuits 122, 124. The first, second, and supplemental pumps 130, 140, 150 can be driven directly or indirectly from the power source 108 of the work vehicle 100, such as an internal combustion engine.

The first, second, and supplemental pumps 130, 140, 150 can be pressure and flow compensated variable displacement (PFC) pumps, each connected to the same or different sumps 128. In some implementations, the first, second, and supplemental pumps 130, 140, 150 are pressure and flow compensated variable displacement axial piston pumps, each having a pressure compensator to limit the maximum system pressure and a flow or load sensing compensator 136, 146, 156 to maintain a predetermined load pressure differential between the outlet port of the pump 130, 140, 150 and the pressure of the load sense circuit 134, 144, 154. The predetermined load pressure differential is determined by a fixed or adjustable differential spring in the load sensing compensator 136, 146, 156. Each flow or load sensing compensator 136, 146, 156 adjusts the swashplate to maintain the predetermined load pressure differential. Each pressure compensator adjusts the swashplate of the pump to limit the maximum operating pressure at the outlet port of the pump.

The first load sense circuit 134 can be connected to the first circuit 122. The second load sense circuit 144 can be connected to the second circuit 124. The supplemental load sense circuit 154 can be connected to the supplemental circuit 126 via a fixed or variable flow control valve or flow restrictor 174. The supplemental load sense circuit 154 can include a first supplemental valve 170, such as an adjustable pressure reducing or pressure reducing and relieving valve connected to a sump 128. A controller 200, described in more detail below, can control the first supplemental valve 170 to provide a desired load sense signal or pressure to the supplemental pump 150 via the supplemental load sense circuit 154. The controller 200 can control the first supplemental valve 170 in an open position so that a reduced or minimal load sense signal or pressure provided to the supplemental load sensing compensator 156 causes the supplemental pump 150 to operate at a reduced or minimal flow. The minimal load sense signal or pressure can be zero or near zero. The minimal flow can be a no-flow or nearly no-flow condition. The controller 200 can control the first supplemental valve 170 in a closed position so that an increased load sense signal or pressure provided to the supplemental load sensing compensator 156 causes the supplemental pump 150 to increase flow. The controller 200 can control the first supplemental valve 170 between the open and closed positions to vary the flow of the supplemental pump 150 so that the pressure in the supplemental circuit 126 is equal to or greater than the pressure in either the first circuit 122 or second circuit 124, depending on whether the first circuit 122 or second circuit 124 requires additional flow. The supplemental pump 150 can operate in a standby condition with a lower or minimal flow at a lower pressure or a use condition with a higher flow at a higher pressure.

The supplemental circuit 126 can provide additional or supplemental flow to the first circuit 122 via a first valve 160, which can be an adjustable or variable two-position valve with an open or flow control position and a closed position, as shown in FIG. 2. The first valve 160 can be a directional control valve or proportional directional control valve. When the first valve 160 is in the open position, fluid can flow from the supplemental circuit 126 to the first circuit 122. When the first valve 160 is in the closed position, fluid is prevented from flowing from the supplemental circuit 126 to the first circuit 122. When the first valve 160 is a partially open position between fully open and closed, fluid can flow from the supplemental circuit 126 to the first circuit 122 in a limited or restricted manner.

Alternatively, or additionally, the supplemental circuit 126 can provide additional or supplemental flow to the second circuit 124 via a second valve 162, which can be an adjustable or variable two-position valve with an open or flow control position and a closed position, as shown in FIG. 3. The second valve 162 can be a directional control valve or proportional directional control valve. When the second valve 162 is in the open position, fluid can flow from the supplemental circuit 126 to the second circuit 124. When the second valve 162 is in the closed position, fluid is prevented from flowing from the supplemental circuit 126 to the second circuit 124. When the second valve 162 is in a partially open position between open and closed, fluid can flow from the supplemental circuit 126 to the second circuit 124 in a limited or restricted manner.

Figure 4:
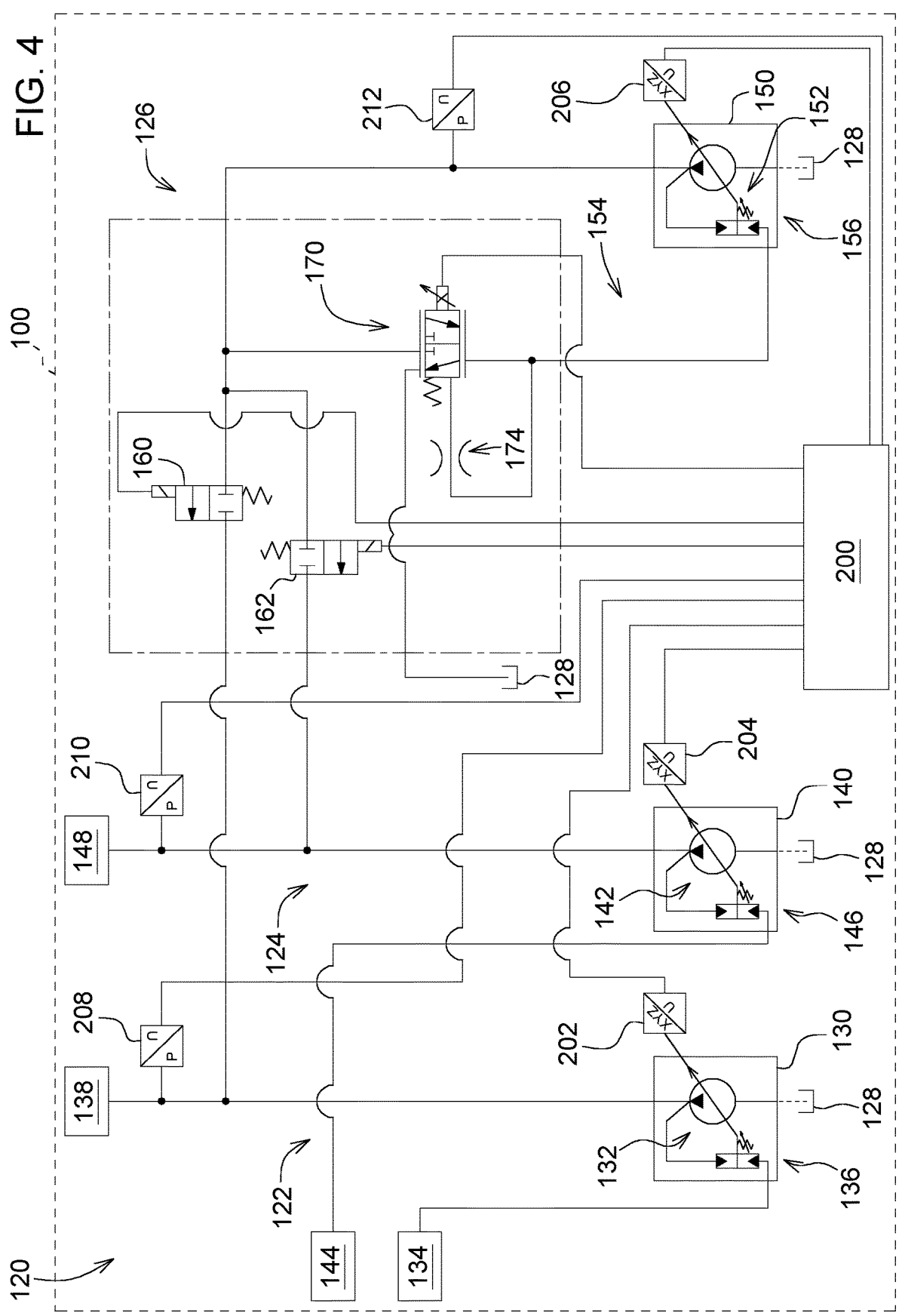
FIG. 4 is a schematic diagram of a hydraulic system for a work vehicle, according to an implementation.

With reference to FIG. 4, the hydraulic system 120 includes similar components as the hydraulic system 120 in FIG. 3, except as shown or described. In some implementations, the supplemental load sense circuit 154 can be connected to the supplemental circuit 126 via a first supplemental valve 170, such as a three-way, two position directional control valve or a proportional directional control valve. The first supplemental valve 170 includes a first position connecting the supplemental load sense circuit 154 to the sump 128 and a second position connecting the supplemental circuit 126 to the supplemental load sense circuit 154. The first supplemental valve 170 can be a pressure reducing or pressure reducing and relieving valve. The pressure reducing line can include a fixed or variable flow control valve or flow restrictor 174. The supplemental circuit 126 can be connected to the first circuit 122 via the first valve 160. Alternatively, or additionally, the supplemental circuit 126 can be connected to the second circuit 124 via the second valve 162.

Figure 5:
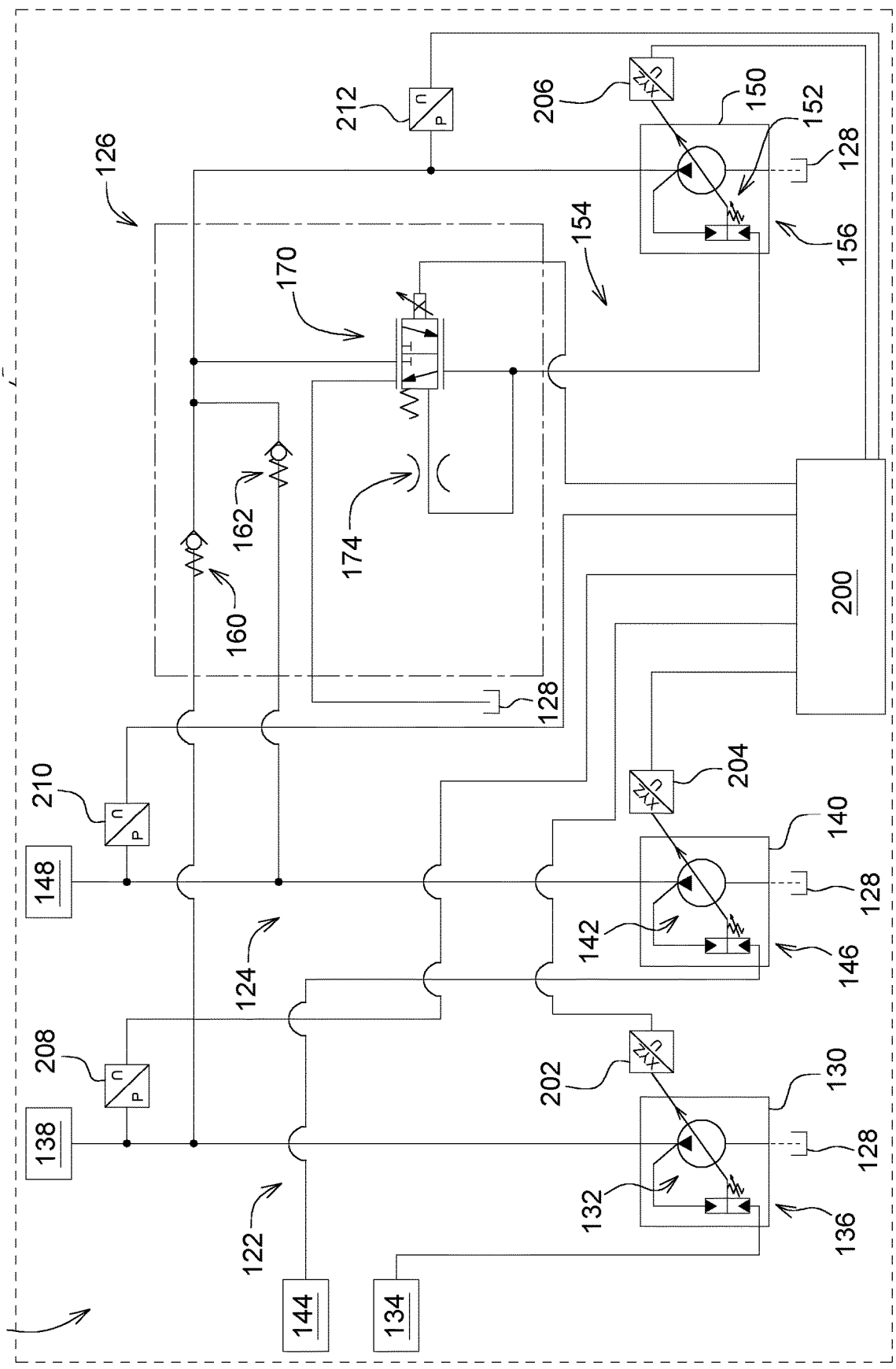
FIG. 5 is a schematic diagram of a hydraulic system for a work vehicle, according to an implementation.

With reference to FIG. 5, the hydraulic system 120 includes similar components as the hydraulic system 120 in FIG. 4, except as shown or described. In some implementations, the first and second valves 160, 162 are check valves. The supplemental circuit 126 can be connected to the first circuit 122 via the first check valve 160. Alternatively, or additionally, the supplemental circuit 126 can be connected to the second circuit 124 via the second check valve 162. The first and second check valves 160, 162 can have any cracking pressure. In one example, the check valves can have a cracking pressure between one and ten bar. In another example, the check valves can have a cracking pressure between three and seven bar. In another example, the check valves can have a cracking pressure around five bar.

Figure 6:
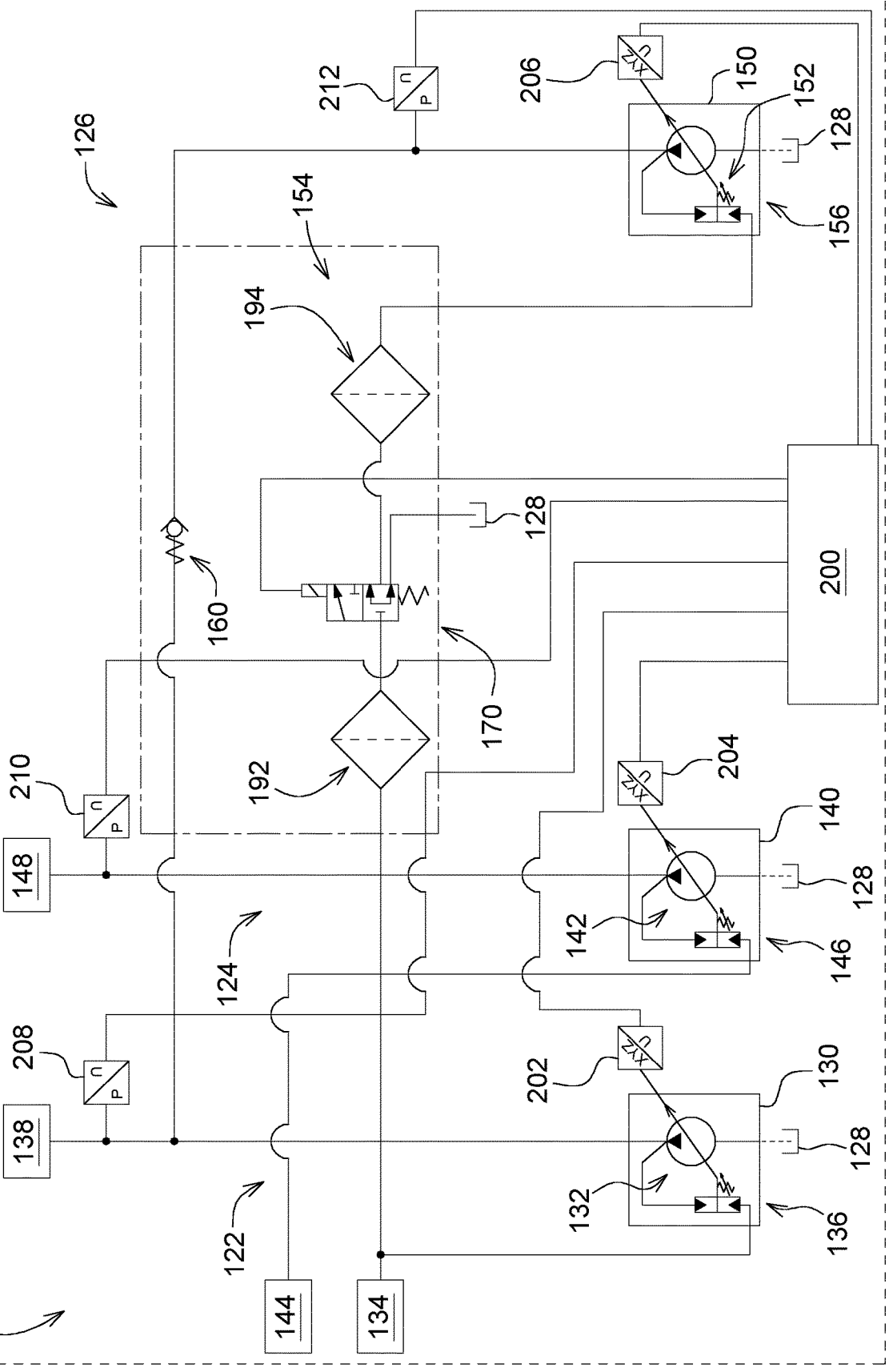
FIG. 6 is a schematic diagram of a hydraulic system for a work vehicle, according to an implementation.

With reference to FIG. 6, the hydraulic system 120 includes similar components as the hydraulic system in FIG. 2, except as shown or described. In some implementations, the first valve 160 is a check valve positioned between the supplemental circuit 126 and the first circuit 122. The supplemental load sense circuit 154 is connected to the first load sense circuit 134 via a first supplemental valve 170, such as a three-way, two position directional control valve or a proportional directional control valve. The first supplemental valve 170 includes a first position connecting the supplemental load sense circuit 154 to the sump 128 and a second position connecting the supplemental load sense circuit 154 to the first load sense circuit 134. The hydraulic system 120 can include a first filter 192 positioned on one side of the first supplemental valve 170 and a second filter 194 positioned on the other side of the first supplemental valve 170.

In some implementations, the hydraulic system 120 in FIG. 6 can include a second valve 162, such as a check valve as shown for example in FIG. 5, positioned between the supplemental circuit 126 and the second circuit 124. The hydraulic system 120 can include an intermediate valve 190 connected to the first load sense circuit 134, the second load sense circuit 144, and the supplemental load sense circuit 154, as shown for example in FIG. 7. Any of the intermediate valves described herein can be a shuttle valve, a flow divider and combiner valve, or any other type of flow combiner valve. The intermediate valve 190 can be positioned between the first load sense circuit 134 and the first supplemental valve 170 and between the second load sense circuit 144 and the first supplemental valve 170, as shown for example in FIG. 7. With the intermediate valve 190, either the first load sense circuit 134 or the second load sense circuit 144 can be connected to the load sensing compensator 156 of the supplemental pump 150.

Figure 8:
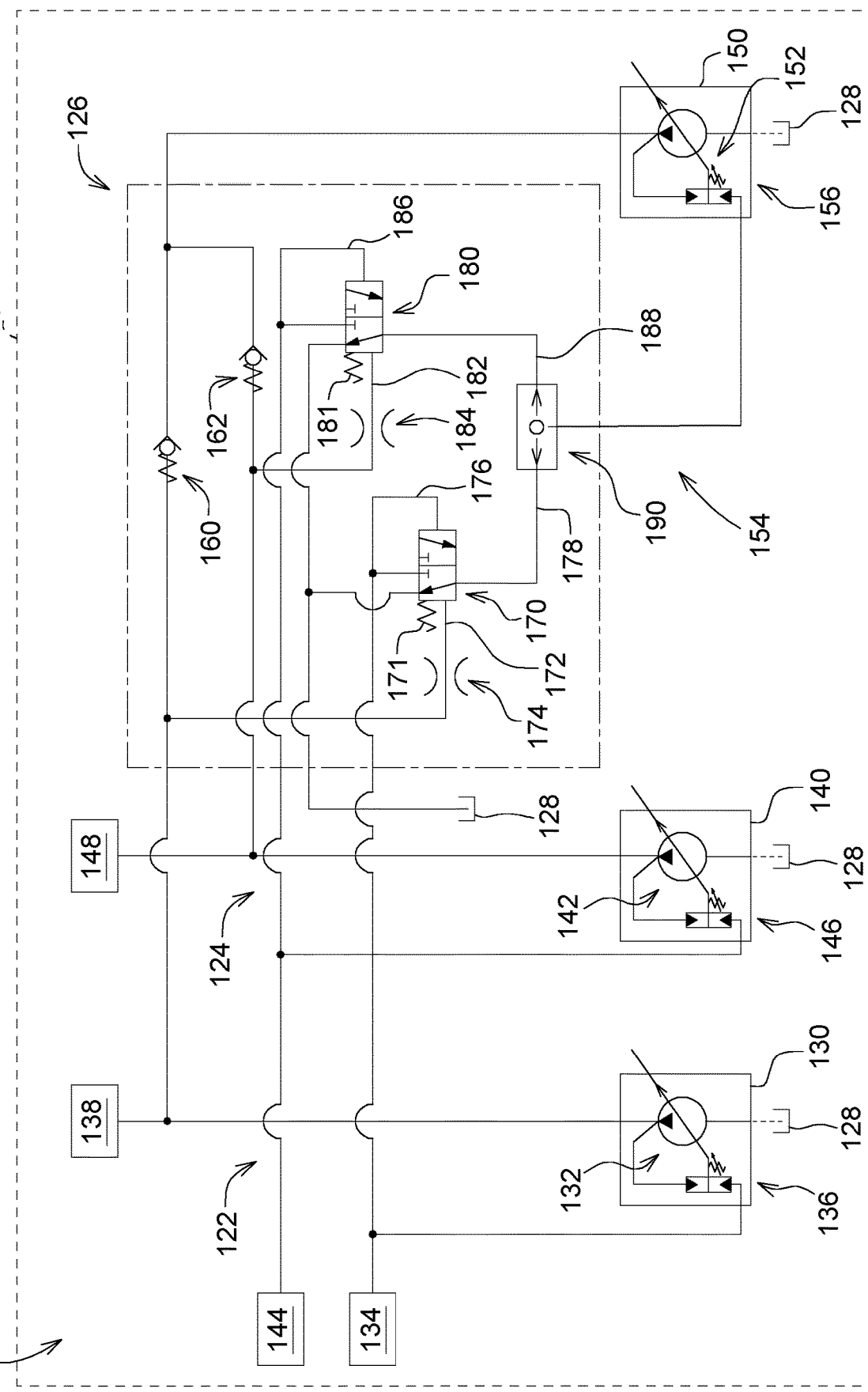
FIG. 8 is a schematic diagram of a hydraulic system for a work vehicle, according to an implementation.

In other implementations, the supplemental load sense circuit 154 in FIG. 6 can be connected to the second load sense circuit 144 via a second supplemental valve 180, such as a three-way, two position directional control valve or a proportional directional control valve as shown for example in FIG. 8. The second supplemental valve 180 includes a first position connecting the supplemental load sense circuit 154 to the sump 128 and a second position connecting the supplemental load sense circuit 154 to the second load sense circuit 144. The hydraulic system 120 can include one or more filters positioned on either side or on both sides of the second supplemental valve 180. The hydraulic system 120 can include an intermediate valve 190 positioned between the first supplemental valve 170 and the supplemental pump 150 and between the second supplemental valve 180 and the supplemental pump 150, as shown for example in FIG. 8. With the intermediate valve 190, either the outlet of the first supplemental valve 170 or the outlet of the second supplemental valve 180 can be connected to the load sensing compensator 156 of the supplemental pump 150.

Figure 7:
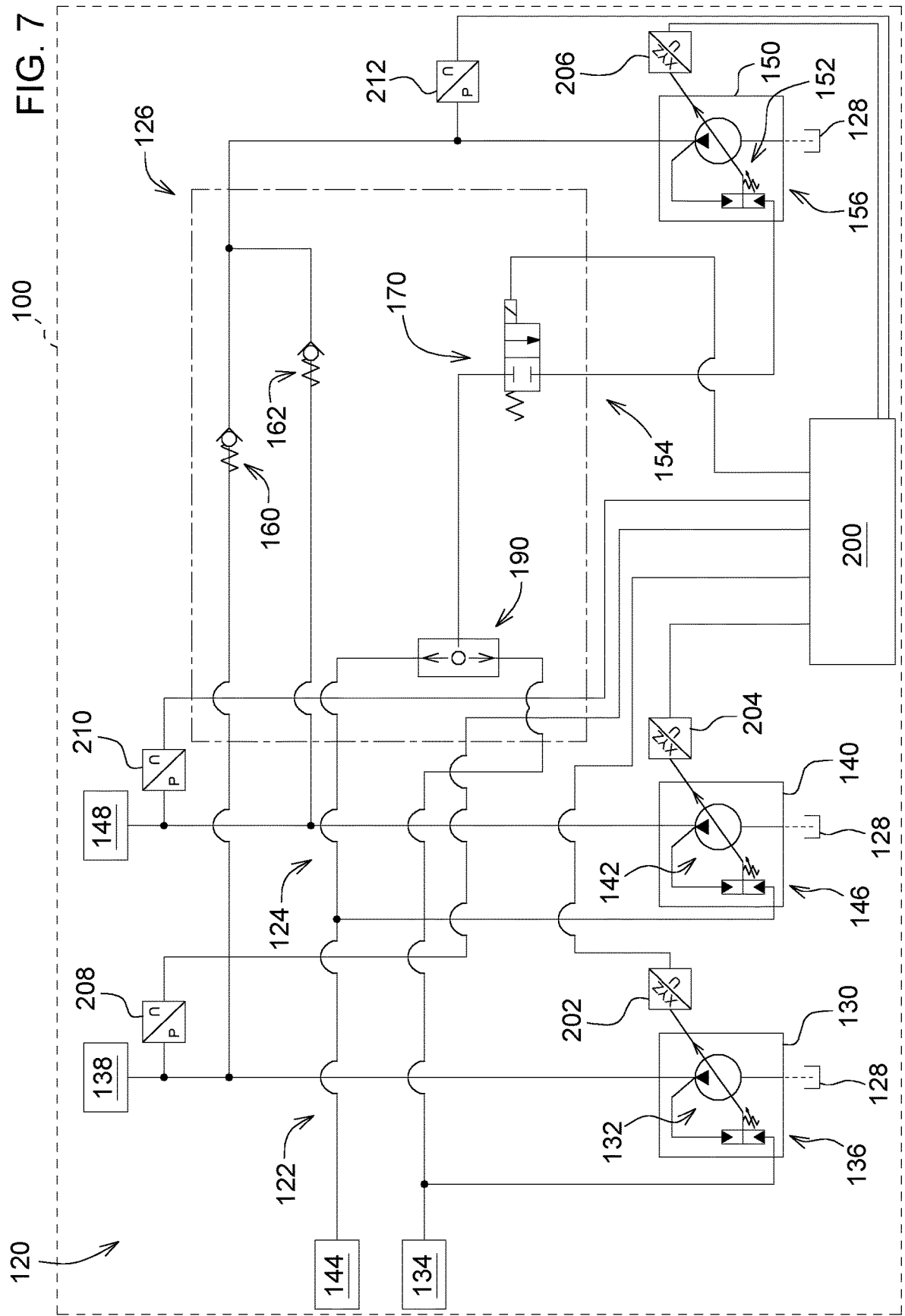
FIG. 7 is a schematic diagram of a hydraulic system for a work vehicle, according to an implementation.

With reference to FIG. 7, the hydraulic system 120 includes similar components as the hydraulic system in FIG. 5, except as shown or described. In some implementations, the supplemental load sense circuit 154 can connect to the first load sense circuit 134, the second load sense circuit 144, or both instead of the supplemental circuit 126. The supplemental circuit 126 can connect to the first circuit 122, the second circuit 124, or to both. An intermediate valve 190 can connect the supplemental load sense circuit 154 to the first load sense circuit 134 or second load sense circuit 144 depending on whether the first load sense circuit 134 or the second load sense circuit 144 has the higher pressure. The supplemental load sense circuit 154 can include a first supplemental valve 170 positioned between the intermediate valve 190 and the supplemental pump 150. The first supplemental valve 170 can be an adjustable or variable two-way, two-position valve with an open or flow control position and a closed position. The first supplemental valve 170 can be a directional control valve or a proportional directional control valve. The first supplemental valve 170 can control the fluid flow between the intermediate valve 190 and the supplemental pump 150. In some implementations, the intermediate valve 190 is a shuttle valve, a flow divider and combiner valve, or any other type of flow combiner valve.

With reference to FIG. 8, the hydraulic system 120 includes similar components as the hydraulic system in FIG. 7, except as shown or described. In some implementations, the supplemental load sense circuit 154 is connected to the first load sense circuit 134 via a first supplemental valve 170, such as a three-way, two position directional control valve or a proportional directional control valve. The first supplemental valve 170 can include a first position connecting the supplemental load sense circuit 154 to the sump 128 and a second position connecting the first load sense circuit 134 to the supplemental load sense circuit 154. The first supplemental valve 170 can include a first pilot line 172 connected to the first circuit 122 via a fixed or variable flow control valve or flow restrictor 174, a second pilot line 176 connected to the first load sense circuit 134, and a first spring 171 biasing the first supplemental valve 170 in the first position. When the pressure in the first pilot line 172 combined with the first spring 171 force is equal to or greater than the pressure in the second pilot line 176, the first supplemental valve 170 moves to or remains in the first position. When the pressure in the second pilot line 176 is equal to or greater than the pressure in the first pilot line 172 combined with the first spring 171 force, the first supplemental valve 170 moves to or remains in the second position.

The supplemental load sense circuit 154 is connected to the second load sense circuit 144 via a second supplemental valve 180, such as a three-way, two position directional control valve or a proportional directional control valve. The second supplemental valve 180 can include a first position connecting the supplemental load sense circuit 154 to the sump 128 and a second position connecting the second load sense circuit 144 to the supplemental load sense circuit 154. The second supplemental valve 180 can include a third pilot line 182 connected to the second circuit 124 via a fixed or variable flow control valve or flow restrictor 184, a fourth pilot line 186 connected to the second load sense circuit 144, and a second spring 181 biasing the second supplemental valve 180 in the first position. When the pressure in the third pilot line 182 combined with the second spring 181 force is equal to or greater than the pressure in the fourth pilot line 186, the second supplemental valve 180 moves to or remains in the first position. When the pressure in the fourth pilot line 186 is equal to or greater than the pressure in the third pilot line 182 combined with the second spring 181 force, the second supplemental valve 180 moves to or remains in the second position.

The supplemental circuit 126 can connect to the first circuit 122, the second circuit 124, or to both. A first intermediate line 178 can connect the first supplemental valve 170 to an intermediate valve 190 and a second intermediate line 188 can connect the second supplemental valve 180 to the intermediate valve 190. The intermediate valve 190 can connect the first intermediate line 178 or the second intermediate line 188 to the load sensing compensator 156 depending on whether the first intermediate line 178 or the second intermediate line 188 has the higher pressure. Alternatively, the first supplemental valve 170, the second supplemental valve 180, or both, can connect directly or through another valve to the load sensing compensator 156 of the supplemental pump 150. Any of the circuits described herein can include one or more lines, connections, or components.

With reference to FIGS. 1-8, the work vehicle 100 can include an electronic control unit or controller 200. The implement 112 can optionally include an electronic control unit, or controller 220. The controllers 200, 220 can be connected via an electrical connector 218. The following description of a controller applies to any of the controllers 200, 220 in the work vehicle 100 or implement 112. The controller can have one or more microprocessor-based electronic control units or controllers, which perform calculations and comparisons and execute instructions. The controller includes a processor, a core, volatile and non-volatile memory, digital and analog inputs, and digital and analog outputs. The controller can include non-transitory, computer readable memory, such as random-access memory (RAM), read only memory (ROM), or electrically erasable programmable read only memory (EEPROM), which include instructions for execution by the processor. The controller connects to and communicates with various input and output devices including, but not limited to, switches, relays, solenoids, actuators, light emitting diodes (LED's), passive and interactive displays, radio frequency devices (RFD's), sensors, and other controllers. The controller receives communications or signals, via electrically or any suitable electromagnetic communication, from one or more devices, determines an appropriate response or action, and sends communications or signals to one or more devices. The controller can be a microprocessor, an application specific integrated circuit (ASIC), a digital processor, or a programmable logic controller, also known as a PLC or programmable controller. The controller can connect to and communicate with an electronic control system of the work vehicle 100, the implement 112, or both through a data bus, such as a CAN bus, or the controller can be a part the electronic control system of the work vehicle 100, the implement 112, or both.

The hydraulic system 120 can include a variety of sensors to detect or measure pressure, flow, load, and other properties of the hydraulic system 120. The hydraulic system 120 can include a first swashplate angle sensor 202 to detect or measure the angle of the swashplate 132 of the first pump 130, a second swashplate angle sensor 204 to detect or measure the angle of the swashplate 142 of the second pump 140, and a supplemental swashplate angle sensor 206 to detect or measure the angle of the swashplate 152 of the supplemental pump 150. The hydraulic system 120 can include a first pressure sensor 208 to detect or measure the pressure in the first circuit 122, a second pressure sensor 210 to detect or measure the pressure in the second circuit 124, and a supplemental pressure sensor 212 to detect or measure the pressure in the supplemental circuit 126. The first pressure sensor 208 can detect or measure the pressure at or near the outlet of the first pump 130. The second pressure sensor 210 can detect or measure the pressure at or near the outlet of the second pump 140. The supplemental pressure sensor 212 can detect or measure the pressure at or near the supplemental pump 150.

The controller 200 can connect to and communicate with the controller 220, the sensors 202, 204, 206, 208, 210, 212, the valves 160, 162, 170, and other electronic devices on the work vehicle 100 or implement 112. The controller 200 can determine the angle of the swashplate 132 of the first pump 130 from the first swashplate angle sensor 202, the angle of the swashplate 142 of the second pump 140 from the second swashplate angle sensor 204, and the angle of the swashplate 152 of the supplemental pump 150 from the supplemental swashplate angle sensor 206. The controller 200 can determine the pressure in the first circuit 122 from the first pressure sensor 208, the pressure in the second circuit 124 from the second pressure sensor 210, and the pressure in the supplemental circuit 126 from the supplemental pressure sensor 212. The controller 200 can determine to operate the valves 160, 162, 170, 180 in their various positions based in part on the information provided by the sensors 202, 204, 206, 208, 210, 212.

During operation of the work vehicle 100 connected to an implement 112, the first circuit 122 is connected to the first implement hydraulic circuit 116 via a first set of SCVs 138. Alternatively, or additionally, the second circuit 124 is connected to the second implement hydraulic circuit 118 via a second set of SCVs 148. The supplemental circuit 126 can be connected to the first circuit 122, the second circuit 124, or both. The supplemental circuit 126 can provide additional or supplemental flow to the first circuit 122, the second circuit 124, or both. The supplemental pump 150 can produce the additional flow requested or required by one or more of the first circuit 122 and the second circuit 124. The supplemental pump 150 can operate in a standby condition at a lower pressure or a use condition at a higher pressure.

The hydraulic system 120 can predict or determine when additional flow will be needed or required to maintain the performance of the first circuit 122, the second circuit 124, or both. The hydraulic system 120 measures the pressure and flow of the first pump 130, the second 140, or both to predict or determine when the additional flow will be needed. The supplemental pump 150 operates at a more efficient low pressure standby when additional flow is not requested or required by the first circuit 122 or the second circuit 124. When the hydraulic system 120 predicts or determines additional flow is requested or required, the hydraulic system 120 energizes the supplemental pump 150 to provide additional flow to the first circuit 122, the second circuit 124, or both. When the hydraulic system 120 predicts or determines the additional flow is no longer required, the hydraulic system 120 returns the supplemental pump 150 to the low pressure standby. In systems in which one or more pumps supply fluid to a single set of SCVs, the supplemental pump 150 can provide additional flow to supplement the one or more pumps. In systems in which a plurality of pumps each supply fluid to separate SCVs, the supplemental pump 150 can provide additional flow to any of or all the plurality of pumps simultaneously.

The controller 200 can determine to operate the supplemental pump 150 in the standby condition until additional flow is requested or required. In the standby condition, the supplemental load sense circuit 154 provides a reduced or minimal load sense pressure to the load sense compensator 156 causing the supplemental pump 150 to provide a lower or minimal flow to the supplemental circuit 126. The supplemental swashplate 152 operates at or near the minimum displacement angle in the standby condition. According to some implementations, the controller 200 can control the supplemental valve 170 to adjust or maintain the pressure in the supplemental load sense circuit 154. The controller 200 can control the supplemental valve 170 to maintain the reduced or minimal load sense pressure in the supplemental load sense circuit 154 when in the standby condition, as shown in FIGS. 2-7. The controller 200 can control the supplemental valve 170 to maintain a zero or near zero pressure in the supplemental load sense circuit 154 when in the standby condition, as shown in FIGS. 2-7.

According to the implementation in FIG. 8, the controller 200 can control the operation or position of one or more of the first supplemental valve 170, the second supplemental valve 180, and the intermediate valve 190. Alternatively, or additionally, the pressure differential between the first circuit 122 and the first load sense circuit 134 can control the position of the first supplemental valve 170. For example, the pressure differential between the first circuit 122 and the first load sense circuit 134 can directly or indirectly move or maintain the first supplemental valve 170 in the first position, the second position, or any position between the first and second positions. Alternatively, or additionally, the pressure differential between the second circuit 124 and the second load sense circuit 144 controls the position of the second supplemental valve 180. For example, the pressure differential between the second circuit 124 and the second load sense circuit 144 can directly or indirectly move or maintain the first supplemental valve 170 in the first position, the second position, or any position between the first and second positions.

When the first supplemental valve 170 is in the first position, the supplemental circuit 126 operates at a lower pressure in the standby condition. When the first supplemental valve 170 is in the second position, then the pressure from the first load sense circuit 134 connects to the load sensing compensator 156 of the supplemental pump 150. When both the first circuit 122 and the second circuit 124 are connected to the supplemental circuit 126, the supplemental circuit 126 operates at a lower pressure in the standby condition when both the first supplemental valve 170 and the second supplemental valve 180 are in the first position. When one of or both the first supplemental valve 170 and the second supplemental valve 180 are in the second position, then the intermediate valve 190 allows one of the first load sense circuit 134 and the second load sense circuit 144 to connect to the load sensing compensator 156 based on whether the first load sense circuit 134 or the second load sense circuit 144 has the higher pressure.

The controller 200 can determine when additional or supplemental flow is required by the first circuit 122, the second circuit 124, or both. For example, the controller 200 can determine when additional flow is required by the first circuit 122 based in part on one or more of a pressure of the first circuit 122 measured by the first pressure sensor 208 and an angle of the first swashplate 132 of the first pump 130 measured by the first swashplate angle sensor 202. The controller 200 can determine additional flow is required when the angle of the first swashplate 132 is at or above a displacement threshold as measured by the first swashplate angle sensor 202. Alternatively, or additionally, the controller 200 can determine additional flow is required when the angle of the second swashplate 142 is at or above a displacement threshold as measured by the second swashplate angle sensor 204.

The first swashplate 132 can vary between a minimum displacement angle and a maximum displacement angle. The minimum displacement angle can be a zero or near zero displacement angle. The maximum displacement angle can be at or near the maximum angle for the swashplate of the pump. The displacement threshold can be a predetermined percentage of the maximum displacement angle of the first swashplate 132. The displacement threshold can be at or near the maximum displacement angle of the first swashplate 132. The pressure in the first circuit 122 can vary based in part on the load of the first circuit 122. The pressure threshold can be at or near a preselected maximum pressure.

If the controller 200 determines additional flow is required, then the controller 200 can operate the supplemental pump 150 in the use condition. The controller 200 can control the position of the first supplemental valve 170 to increase the load sense pressure in the supplemental load sense circuit 154 connected to the load sensing compensator 156. The increased or higher load sense pressure provided to the load sensing compensator 156 causes the displacement angle of the supplemental swashplate 152 to increase greater than the minimum displacement angle. The supplemental pump 150 increases flow in the supplemental circuit 126, which causes the pressure to increase in the supplemental circuit 126 as measured by the supplemental pressure sensor 212.

The controller 200 can adjust or vary the pressure reducing valve 170 to prevent the supplemental load sense circuit 154 from dumping to the sump 128, which increases the load sense pressure in the supplemental load sense circuit 154, as shown in FIGS. 2 and 3. The controller 200 can move the proportional directional control valve 170 to the second position connecting the supplemental circuit 126 to the supplemental load sense circuit 154 and increasing the load sense pressure in the supplemental load sense circuit 154, as shown in FIGS. 4 and 5.

The controller 200 can move the proportional directional control valve 170 to the second position connecting the first load sense circuit 134 to the supplemental load sense circuit 154, as shown in FIG. 6. The connection to the first load sense circuit 134 increases the load sense pressure provided to the load sensing compensator 156 via the supplemental load sense circuit 154. The increased or higher load sense pressure provided to the load sensing compensator 156 causes the supplemental pump 150 to increase flow in the supplemental circuit 126, which results in an increased or higher pressure in the supplemental circuit 126. The supplemental swashplate 152 operates between the minimum and maximum displacement angles based upon the pressure differential between the load sense pressure in the supplemental load sense circuit 154 provided to the load sensing compensator 156 and the pressure in the supplemental circuit 126.

The controller 200 can move the proportional directional control valve 170 to the second position connecting the supplemental circuit 126 to either the first load sense circuit 134 or the second load sense circuit 144 via the intermediate valve 190 based on whether the first load sense circuit 134 or the second load sense circuit 144 has the higher pressure, as shown in FIG. 7. The connection to either the first load sense circuit 134 or the second load sense circuit 144 increases the pressure provided to the load sensing compensator 156 via the supplemental load sense circuit 154.

According to the implementation in FIG. 8, the pressure differential between the first circuit 122 and the first load sense circuit 134 can move the first supplemental valve 170 to the second position. Alternatively, or additionally, the pressure differential between the second circuit 124 and the second load sense circuit 144 can move the second supplemental valve 180 to the second position. The intermediate valve 190 can connect either the pressure of the first load sense circuit 134 or the second load sense circuit 144 to the supplemental load sense circuit 154 based on whether the first intermediate line 178 from the first supplemental valve 170 or the second intermediate line 188 from the second supplemental valve 180 has the higher pressure. This connection to either the first load sense circuit 134 or the second load sense circuit 144 increases the pressure provided to the load sensing compensator 156 via the supplemental load sense circuit 154, which causes the supplemental pump 150 to increase the flow in the supplemental circuit 126.

When the pressure in the supplemental circuit 126 increases to a higher pressure equal to or greater than the first circuit 122, the supplemental circuit 126 can provide additional flow to the first circuit 122 via the first valve 160, to the second circuit 124 via the second valve 162, or to both the first and second circuits 122, 124. When the first valve 160 is a directional control valve or proportional directional control valve, the controller 200 can open or partially open the first valve 160 after the pressure in the supplemental circuit 126 is equal to or greater than the pressure in the first circuit 122, as shown in FIG. 2-4. Alternatively, or additionally, the controller 200 can open or partially open the second valve 162 after the pressure in the supplemental circuit 126 is equal to or greater than the pressure in the second circuit 124.

When the first valve 160 is a check valve, fluid flows from the supplemental circuit 126 to the first circuit 122 when the pressure in the supplemental circuit 126 is equal to or greater than the combined pressure in the first circuit 122 and the selected cracking pressure of the first check valve 160, as shown in FIG. 5-8. Alternatively, or additionally, when the second valve 162 is a check valve, fluid flows from the supplemental circuit 126 to the second circuit 124 when the pressure in the supplemental circuit 126 is equal to or greater than the combined pressure in the second circuit 124 and the selected cracking pressure of the second check valve 162.

The supplemental pump 150 continues to provide additional flow in the use condition until the additional flow is no longer required, for example when the flow demand or load of the first circuit 122 decreases below the flow threshold of the first pump 130. The flow threshold can be a predetermined percentage of the maximum available flow of the first pump 130 or the second pump 140. The flow threshold can correspond to the displacement threshold of the first swashplate 132 of the first pump 130 or the second swashplate 142 of the second pump 140. The controller 200 can determine additional flow is not required when the angle of the first swashplate 132 is at or below a displacement threshold. Alternatively, or additionally, the controller 200 can determine additional flow is not required when the pressure in the first circuit 122 is at or below a pressure threshold. The supplemental pump 150 returns to the standby condition when the supplemental load sense circuit 154 provides a reduced or minimal load sense pressure to the load sensing compensator 156. The controller 200 can decrease or reduce the pressure in the supplemental load sensing circuit 154 to provide a reduced or minimal load sense pressure to the load sensing compensator 156 returning the supplemental pump 150 to the standby condition.

According to some implementations, the controller 200 can control the supplemental valve 170 to reduce the pressure provided to the load sensing compensator 156 via the supplemental load sense circuit 154 returning the supplemental pump 150 to the standby condition. In FIGS. 2 and 3, the controller 200 controls the pressure reducing or pressure reducing and relieving valve 170 to reduce the pressure in the supplemental load sense circuit 154 and the load sensing compensator 156. In FIGS. 4-7, the controller 200 moves or maintains the directional control valve or proportional direction control valve 170 in the first position reducing the pressure in the supplemental load sense circuit 154 provided to the load sensing compensator 156.

In other implementations, the pressure differential between the first circuit 122 and the first load sense circuit 134 moves or maintains the first supplemental valve 170 in the first position, as shown in FIG. 8. Alternatively, or additionally, the pressure differential between the second circuit 124 and the second load sense circuit 144 moves or maintains the second supplemental valve 180 in the first position. When the flow demand or load of the first circuit 122 decreases below the flow threshold of the first pump 130, the pressure in the first load sense circuit 134 decreases, which decreases the pressure in the second pilot line 176. When the pressure in the second pilot line 176 is less than the combined pressure in the first pilot line 172 and the first spring 171 force, then the first supplemental valve 170 returns to the first position. When the flow demand or load of the second circuit 124 decreases below the flow threshold of the second pump 140, the pressure in the second load sense circuit 144 decreases, which decreases the pressure in the fourth pilot line 186. When the pressure in the fourth pilot line 186 is less than the combined pressure in the third pilot line 182 and the second spring 181 force, then the second supplemental valve 180 returns to the first position.

Figure 9:
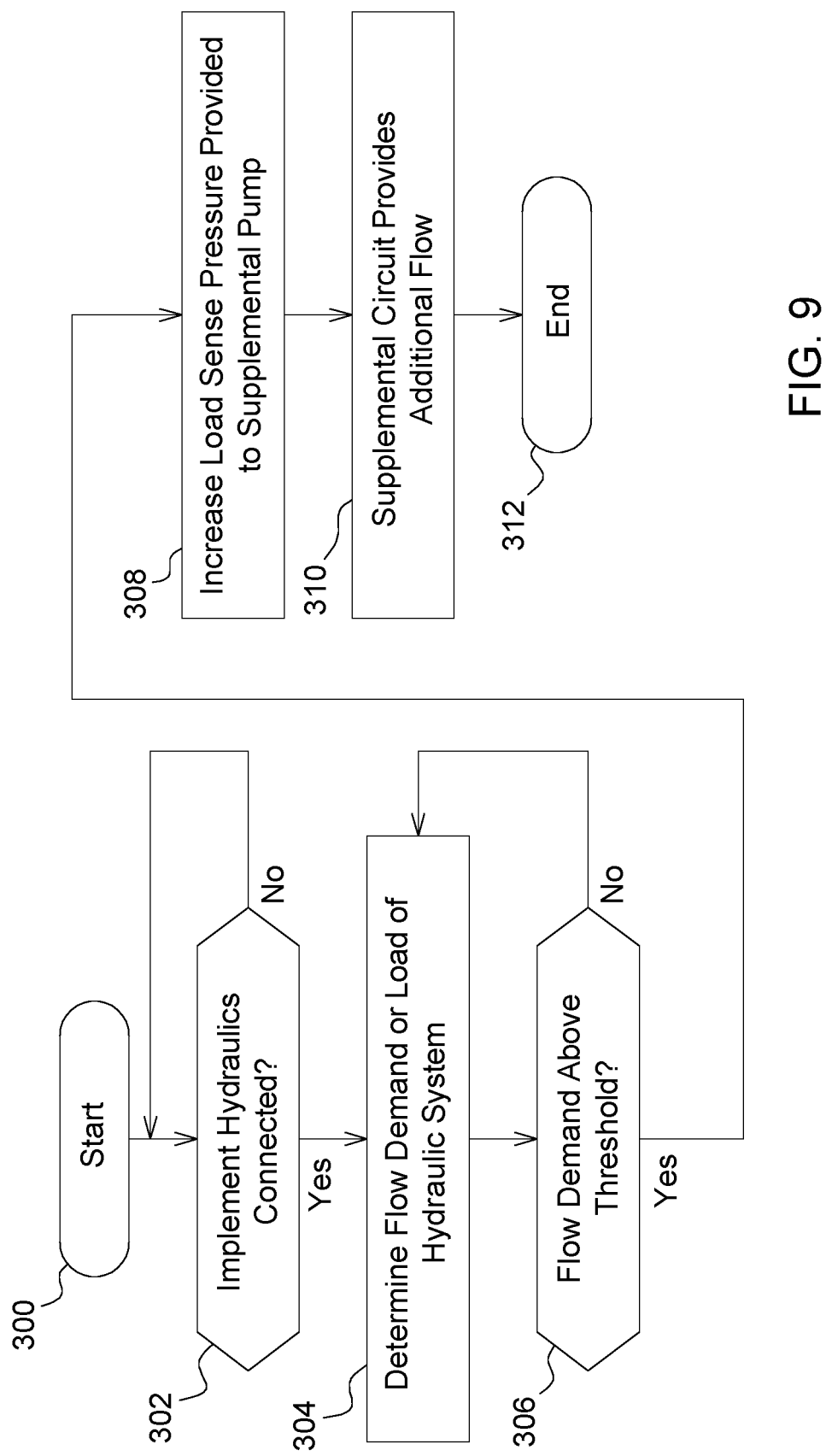
FIG. 9 is a flow diagram of a hydraulic system for a work vehicle, according to an implementation.

FIG. 9 illustrates a method providing additional flow in a hydraulic system 120, which may be utilized in one or more of the implementations described herein and depicted in the various FIGURES. The following description is also applicable to the second circuit 124 or to both the first and second circuits 122, 124. At step 300, the method starts.

At step 302, the hydraulic system 120 determines whether an implement hydraulic system 114 is connected. The controller 200 can determine whether the first circuit 122 is connected to the first implement circuit 116 based in part on the first swashplate angle sensor 202, the first pressure sensor 208, or both. If the hydraulic system 114 of the implement 112 is connected to the hydraulic system 120 of the work vehicle 100, then the method continues to step 304. Otherwise, the method returns to step 302.

At step 304, the hydraulic system 120 determines the flow demand and load of the first circuit 122. The controller 200 communicates with the swashplate angle sensor 202 to determine flow demand and the pressure sensor 208 to determine the load. Alternatively, the hydraulic circuit 120 determines the flow demand and load based at least in part on the pressure differential between the first circuit 122 and the first load sense circuit 134.

At step 306, the hydraulic system 120 determines whether the flow demand of the implement hydraulic system 114 exceeds a flow threshold of the work vehicle hydraulic system 120. The controller 200 can determine the flow demand is above the flow threshold when the angle of the first swashplate 132 is at or above a displacement threshold. Alternatively, the hydraulic circuit 120 can determine the flow demand is above a flow threshold based at least in part when the pressure differential between the first circuit 122 and the first load sense circuit 134 causes the first supplemental valve 170 to move to the second position. If the flow demand is above the flow threshold, then the method continues to step 308. Otherwise, the method returns to step 304.

At step 308, the hydraulic system 120 provides an increased load sense signal or pressure to the supplemental pump 150. The controller 200 can control the position of the first supplemental valve 170 to provide the appropriate pressure to the load sensing compensator 156 of the supplemental pump 150. The controller 200 can control the position of the first supplemental valve 170 to provide pressure from the supplemental circuit 126, the first load sense circuit 134, or the first circuit 122 to the load sensing compensator 156. Alternatively, the hydraulic system 120 can provide pressure from the first load sense circuit 134 to the load sensing compensator 156 based at least in part on the pressure differential between the first circuit 122 and the first load sense circuit 134.

At step 310, the supplemental pump 150 increases the flow in the supplemental circuit 126 based on the pressure differential between the supplemental load sense circuit 154 and the supplement circuit 126. When the pressure in the supplement circuit 126 is at or above the pressure in the first circuit 122, the controller 200 opens the first valve 160 to allow the additional flow from the supplemental circuit 126 to the first circuit 122. Alternatively, the first check valve 160 opens when the pressure in the supplemental circuit 126 is equal to or greater than the combined pressure in the first circuit 122 and the selected cracking pressure of the first check valve 160.

At step 312, the method of providing additional flow in a hydraulic system 120 is complete, according to one implementation. In other implementations, one or more of these steps, processes, or operations may be omitted, repeated, re-ordered, combined, or separated and still achieve the desired results.

Figure 10:
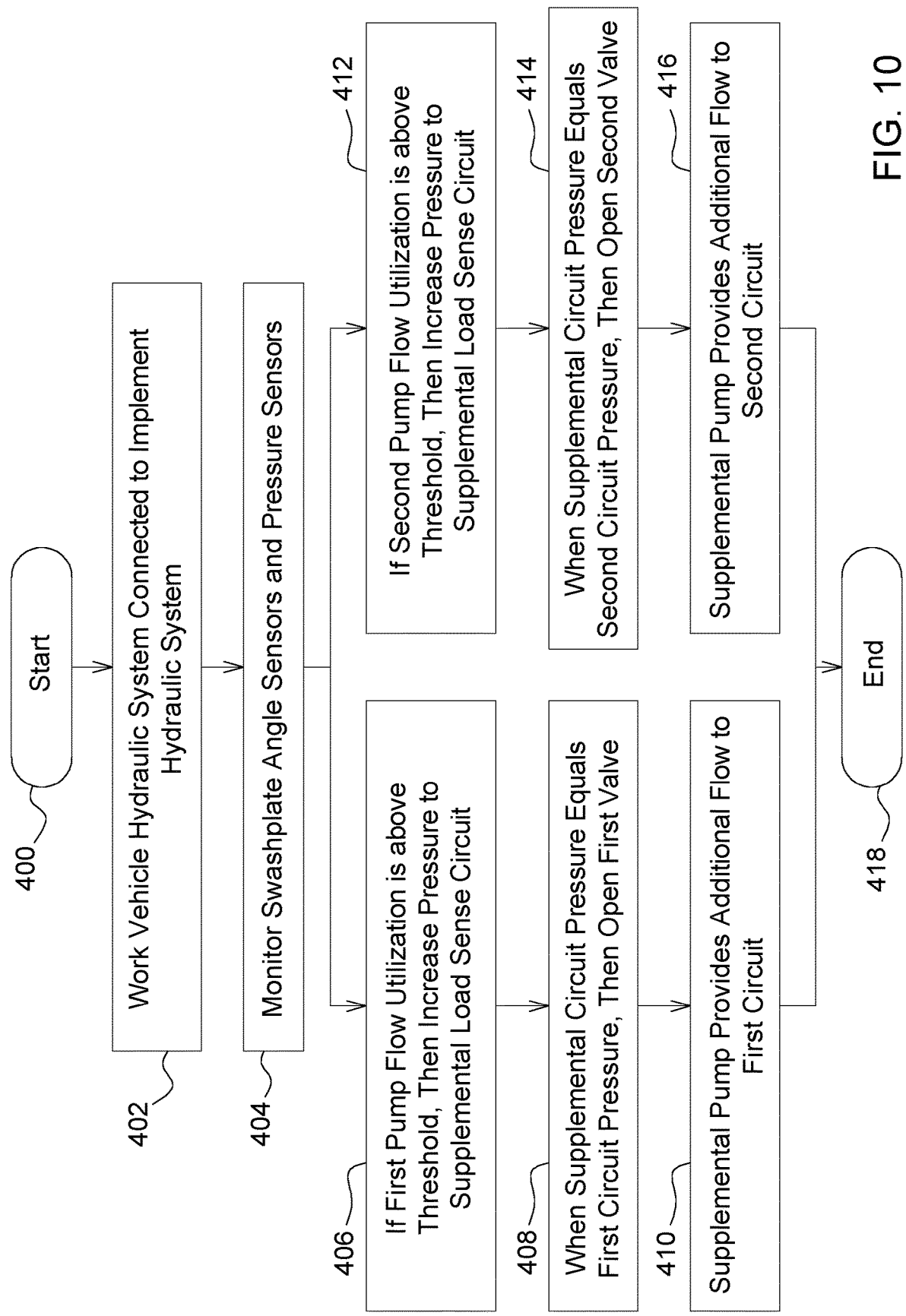
FIG. 10 is a flow diagram of a hydraulic system for a work vehicle, according to an implementation.

FIG. 10 illustrates a method providing additional flow in a hydraulic system 120, which may be utilized in one or more of the implementations described herein and depicted in the various FIGURES. At step 400, the method starts.

At step 402, the work vehicle hydraulic system 120 is connected to the implement hydraulic system 114. The first circuit 122 is connected to the first implement circuit 116 via a first set of SCVs 138, and the second circuit 124 is connected to the second implement circuit 118 via second set of SCVs 148.

At step 404, the controller 200 communicates with the first swashplate angle sensor 202, the second swashplate angle sensor 204, the first pressure sensor 208, and the second pressure sensor 210. The controller 200 determines flow demand of the first implement circuit 116 based in part on the first swashplate angle sensor 202 and the flow demand the second implement circuit 118 based in part on the second swashplate angle sensor 204. The controller 200 determines the load of the first implement circuit 116 based in part on the first pressure sensor 208 and the load of the second implement circuit 118 based in part on the second pressure sensor 210.

At step 406, the hydraulic system 120 determines whether the flow demand of the first implement circuit 116 exceeds the flow threshold of the first pump 130. The controller 200 can determine the flow demand is above the flow threshold when the angle of the first swashplate 132 is at or above a displacement threshold. Alternatively, the hydraulic circuit 120 can determine the flow demand is above a flow threshold based at least in part when the pressure differential between the first circuit 122 and the first load sense circuit 134 causes the first supplemental valve 170 to move to the second position. If the flow demand of the first implement circuit 116 is above the flow threshold, then the hydraulic system 120 provides a load sense signal or pressure to the supplemental pump 150. The controller 200 can control the position of the first supplemental valve 170 to provide pressure to the load sensing compensator 156 from the supplemental circuit 126, the first load sense circuit 134, or the first circuit 122. Alternatively, the hydraulic system 120 can provide pressure from the first load sense circuit 134 to the load sensing compensator 156 based in part on the pressure differential between the first circuit 122 and the first load sense circuit 134. When the pressure in the second pilot line 176 is equal to or greater than the combined pressure in the first pilot line 172 and the first spring 171 force, the first supplemental valve 170 moves to the second position and the load sensing compensator 156 receives the pressure from the first load sense circuit 134 causing the supplemental pump 150 to increase the flow in the supplemental circuit 126.

At step 408, when the pressure in the supplement circuit 126 is at or above the pressure in the first circuit 122, the controller 200 opens the first valve 160 to allow the additional flow from the supplemental circuit 126 to the first circuit 122. Alternatively, the first check valve 160 opens when the pressure in the supplemental circuit 126 is equal to or greater than the combined pressure in the first circuit 122 and the selected cracking pressure of the first check valve 160.

At step 410, the supplemental pump 150 provides additional flow to the first circuit 122.

At step 412, the hydraulic system 120 determines whether the flow demand of the second implement circuit 118 exceeds the flow threshold of the second pump 140. The controller 200 can determine the flow demand is above the flow threshold when the angle of the second swashplate 142 is at or above a displacement threshold. Alternatively, the hydraulic circuit 120 can determine the flow demand is above a flow threshold based at least in part when the pressure differential between the second circuit 124 and the second load sense circuit 144 causes the second supplemental valve 180 to move to the second position. If the flow demand in the second implement circuit 118 is above the flow threshold, then the hydraulic system 120 provides a load sense signal or pressure to the supplemental pump 150. The controller 200 can control the position of the second supplemental valve 180 to provide pressure to the load sensing compensator 156 from the supplemental circuit 126, the second load sense circuit 144, or the second circuit 124. Alternatively, the hydraulic system 120 can provide pressure from the second load sense circuit 144 to the load sensing compensator 156 based in part on the pressure differential between the second circuit 124 and the second load sense circuit 144. When the pressure in the fourth pilot line 186 is equal to or greater than the combined pressure in the third pilot line 182 and the second spring 181 force, the second supplemental valve 180 moves to the second position and the load sensing compensator 156 receives the pressure from the second load sense circuit 144 causing the supplemental pump 150 increases the flow in the supplemental circuit 126.

At step 414, when the pressure in the supplement circuit 126 is at or above the pressure in the second circuit 124, the controller 200 opens the second valve 162 to allow the additional flow from the supplemental circuit 126 to the second circuit 124. Alternatively, the second check valve 162 opens when the pressure in the supplemental circuit 126 is equal to or greater than the combined pressure in the second circuit 124 and the selected cracking pressure of the second check valve 162.

At step 416, the supplemental pump 150 provides additional flow to the second circuit 124.

At step 418, the method of providing additional flow in a hydraulic system 120 is complete, according to one implementation. In other implementations, one or more of these steps, processes, or operations may be omitted, repeated, re-ordered, combined, or separated and still achieve the desired results.

Without in any way limiting the scope, interpretation, or application of the claims appearing below, a technical effect of one or more of the example implementations disclosed herein is a hydraulic system for a work vehicle which has a supplemental pump to provide additional flow to one or more primary hydraulic circuits connected to one or more implement hydraulic circuits. Another technical effect of one or more of the example implementations disclosed herein is a supplemental pump which provides additional flow on demand and has an efficient low pressure standby condition resulting in reduced parasitic losses. Another technical effect of one or more of the example implementations disclosed herein is allowing the work vehicle, such as an agricultural tractor, to operate at a lower engine speed and still maintain sufficient hydraulic flow for optimal implement performance. Operating at lower engine speeds improves the overall efficiency of the work machine. Lower engine speeds also reduce the noise level experienced by the operator and the surrounding environment.

The terminology used herein is for describing particular implementations and is not intended to be limiting of the disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Any reference numbers, numerals, letters, or symbols in the claims are merely for reference and do not limit the scope of the claims to the one or more implementations represented herein.

While the above describes example implementations of the present disclosure, these descriptions should not be viewed in a restrictive or limiting sense. Rather, there are several variations and modifications which may be made without departing from the scope of the appended claims.

What is claimed is:
1. A hydraulic system for a work vehicle comprising:
 a first pump having a first swashplate, the first pump providing a first flow in a first circuit to a first plurality of selective control valves, the first circuit having a first pressure;

a first load sense circuit connected to a first load sensing compensator of the first pump, the first load sense circuit having a first load sense pressure;

a supplemental pump having a supplemental swashplate, the supplemental pump providing a supplemental flow to a supplemental circuit, the supplemental pump operating at a lower flow in a standby condition and a higher flow in a use condition, the supplemental circuit having a supplemental pressure;

a supplemental load sense circuit connected to a supplemental load sensing compensator of the supplemental pump, the supplemental load sense circuit having a supplemental load sense pressure;

a first supplemental valve having a first position preventing flow and a second position allowing flow from the first load sense circuit to the supplemental load circuit, the position of the first supplemental valve based in part on a first pressure differential between the first pressure and the first load sense pressure; and a first valve selectively enabling flow from the supplemental circuit to the first circuit when the supplemental pressure is equal to or greater than the first pressure.

2. The hydraulic system of claim 1, further comprising:
a second pump having a second swashplate, the second pump providing a second flow in a second circuit to a second plurality of selective control valves, the second circuit having a second pressure;

a second load sense circuit connected to a second load sensing compensator of the second pump, the second load sense circuit having a second load sense pressure;

a second supplemental valve having a first position preventing flow and a second position allowing flow from the second load sense circuit to the supplemental load circuit, the position of the second supplemental valve based in part on a second pressure differential between the second pressure and the second load sense pressure; and a second valve selectively enabling flow from the supplemental circuit to the second circuit when the supplemental pressure is equal to or greater than the second pressure.

3. The hydraulic system of claim 1, wherein the first supplemental valve is connected to the first circuit via a first pilot line and to the first load sense circuit via a second pilot line.

4. The hydraulic system of claim 3, wherein the first supplemental valve is in the first position when a pressure in the second pilot line is less than a combined pressure in the first pilot line and a first spring force.

5. The hydraulic system of claim 3, wherein the first supplemental valve is in the second position when a pressure in the second pilot line is greater than a combined pressure in the first pilot line and a first spring force.

6. The hydraulic system of claim 2, wherein the second supplemental valve is connected to the second circuit via a third pilot line and to the second load sense circuit via a fourth pilot line.

7. The hydraulic system of claim 6, wherein the second supplemental valve is in the first position when a pressure in the fourth pilot line is less than a combined pressure in the third pilot line and a second spring force.

8. The hydraulic system of claim 6, wherein the second supplemental valve is in the second position when a pressure in the fourth pilot line is greater than a combined pressure in the third pilot line and a second spring force.

9. The hydraulic system of claim 2, further comprising:
an intermediate valve connecting one of the first load sense circuit and the load sense circuit to the supplemental load sensing compensator based in part on the greater of the first pressure differential and the second pressure differential.

10. The hydraulic system of claim 1, wherein the supplemental load sense circuit provides a minimal supplemental load sense pressure to the supplemental load sensing compensator when the first supplemental valve is in the first position, which causes the supplemental pump to provide the lower flow.

11. The hydraulic system of claim 1, wherein the supplemental load sense circuit provides a higher supplemental load sense pressure to the supplemental load sensing compensator when the first valve is in the second position, which causes the supplemental pump to provide the higher flow.

12. The hydraulic system of claim 2, wherein the supplemental load sense circuit provides a minimal supplemental load sense pressure to the supplemental load sensing compensator when both the first supplemental valve is in the first position and the second supplemental valve is in the first position, which causes the supplemental pump to provide the lower flow.

13. The hydraulic system of claim 2, wherein the supplemental load sense circuit provides a higher supplemental load sense pressure to the supplemental load sensing compensator when one or more of the first supplemental valve is in the second position and the second supplemental valve is in the second position, which causes the supplemental pump to provide the higher flow.

14. A method of providing supplemental flow for a hydraulic system of a work vehicle comprising:
operating a first pump to provide a first flow in a first circuit having a first pressure to a first plurality of selective control valves;

adjusting a first swashplate of the first pump via a first load sense circuit having a first load sense pressure;

operating a supplemental pump to provide a lower flow in a standby condition and a higher flow in a use condition in a supplemental circuit having a supplemental pressure;

adjusting a supplemental swashplate of the supplemental pump via a supplemental load sense circuit having a supplemental load sense pressure;

selectively enabling flow from the first load sense circuit to the supplemental load circuit via a first supplemental valve based in part on a first pressure differential between the first pressure and the first load sense pressure; and selectively enabling flow from the supplemental circuit to the first circuit via a first valve when the supplemental pressure is equal to or greater than the first pressure.

15. The method of claim 14, further comprising:
operating a second pump to provide a second flow in a second circuit having a second pressure to a second plurality of selective control valves;

adjusting a second swashplate of the second pump via a second load sense circuit having a second load sense pressure;

selectively enabling flow from the second load sense circuit to the supplemental load circuit via a second supplemental valve based in part on a second pressure differential between the second pressure and the second load sense pressure; and selectively enabling flow from the supplemental circuit to the second circuit via a second valve when the supplemental pressure is equal to or greater than the second pressure.

16. The method of claim 15, further comprising:
selectively enabling flow from one of the first load sense circuit and the second load sense circuit to the supplemental load sensing compensator via an intermediate valve based in part on the greater of the first pressure differential and the second pressure differential.

17. The method of claim 14, further comprising:
operating the first supplemental valve in a first position preventing flow from the first load sense circuit to the supplemental load circuit when a pressure in a second pilot line connected to the first load sense circuit is less than a combined pressure in a first pilot line connected to the first circuit and a first spring force of the first supplemental valve; and
operating the first supplemental valve in a second position allowing flow from the first load sense circuit to the supplemental load circuit when a pressure in a second pilot line connected to the first load sense circuit is greater than a combined pressure in a first pilot line connected to the first circuit and a first spring force of the first supplemental valve.

18. The method of claim 15, further comprising:
operating the second supplemental valve in a first position preventing flow from the second load sense circuit to the supplemental load circuit when a pressure in a fourth pilot line connected to the second load sense circuit is less than a combined pressure in a third pilot line connected to the second circuit and a second spring force of the second supplemental valve; and
operating the second supplemental valve in a second position allowing flow from the second load sense circuit to the supplemental load circuit when a pressure in a fourth pilot line connected to the second load sense circuit is greater than a combined pressure in a third pilot line connected to the second circuit and a second spring force of the second supplemental valve.

19. The method of claim 15, further comprising:
providing a minimal supplemental load sense pressure to the supplemental load sensing compensator via the supplemental load sense circuit when the first supplemental valve is in the first position and the second supplemental valve is in the first position, which causes the supplemental pump to provide the lower flow.

20. The method of claim 15, further comprising:
providing a higher supplemental load sense pressure to the supplemental load sensing compensator via the supplemental load sense circuit when one or more of the first supplemental valve is in the second position and the second supplemental valve is in the second position, which causes the supplemental pump to provide the higher flow.

* * * * *